(12) United States Patent
Mayor Lusarreta et al.

(10) Patent No.: US 10,680,531 B2
(45) Date of Patent: Jun. 9, 2020

(54) ELECTRIC POWER CONVERTER SYSTEM WITH PARALLEL UNITS AND FAULT TOLERANCE

(75) Inventors: Jesús Mayor Lusarreta, Sariguren (ES); Carlos Gironés Remírez, Sariguren (ES)

(73) Assignee: INGETEAM POWER TECHNOLOGY, S.A., Zamudio (Bizkaia) (ES)

(*) Notice: Subject to any disclaimer, the term of this patent is extended or adjusted under 35 U.S.C. 154(b) by 1232 days.

(21) Appl. No.: 14/346,654

(22) PCT Filed: Sep. 22, 2011

(86) PCT No.: PCT/ES2011/070662
§ 371 (c)(1),
(2), (4) Date: Apr. 28, 2014

(87) PCT Pub. No.: WO2013/041737
PCT Pub. Date: Mar. 28, 2013

(65) Prior Publication Data
US 2014/0312704 A1    Oct. 23, 2014

(51) Int. Cl.
*H02M 5/458* (2006.01)
*H02M 1/32* (2007.01)
*H02M 1/00* (2006.01)
*H02J 3/38* (2006.01)

(52) U.S. Cl.
CPC ............. *H02M 5/458* (2013.01); *H02M 1/32* (2013.01); *H02J 3/386* (2013.01); *H02M 2001/0054* (2013.01); *H02M 2001/325* (2013.01); *H02M 2001/327* (2013.01); *Y02B 70/1491* (2013.01); *Y02E 10/763* (2013.01); *Y10T 307/707* (2015.04)

(58) Field of Classification Search
CPC ...... H02M 5/458; Y10T 307/707; H02J 3/386
USPC ............................................... 307/82; 290/44
See application file for complete search history.

(56) References Cited

U.S. PATENT DOCUMENTS

| | | |
|---|---|---|
| 6,256,212 B1 | 7/2001 | Wobben |
| 2006/0214428 A1* | 9/2006 | Altemark .................. H02J 3/38 290/44 |
| 2007/0085344 A1 | 4/2007 | Janssen et al. |
| 2009/0218078 A1* | 9/2009 | Brunschwiler ........... G06F 1/20 165/104.33 |
| 2011/0133461 A1 | 6/2011 | Hjort |

FOREIGN PATENT DOCUMENTS

| | | |
|---|---|---|
| DE | 197 48 479 C1 | 4/1999 |
| WO | 2005/027301 A1 | 3/2005 |
| WO | 2009/027520 A2 | 3/2009 |
| WO | 2010/079235 A2 | 7/2010 |

\* cited by examiner

*Primary Examiner* — Alfonso Perez Borroto
(74) *Attorney, Agent, or Firm* — Sughrue Mion, PLLC

(57) ABSTRACT

The present invention relates to an electric energy conversion method and system with at least two conversion units (14), comprising control means (12) establishing the maximum output current of the operative conversion modules, as well as the commutation frequency of the entire or of a sub-group of the operative conversion modules to thus increase the availability of the conversion system in the event of failures.

8 Claims, 3 Drawing Sheets

ELECTRIC POWER CONVERTER SYSTEM WITH PARALLEL UNITS AND FAULT TOLERANCE

CROSS REFERENCE TO RELATED APPLICATIONS

This application is a National Stage of International Application No. PCT/ES2011/070662, filed on Sep. 22, 2011, the contents of which are incorporated herein by reference in their entirety.

FIELD OF THE INVENTION

The present invention is applied to the field of electric energy supply, and more specifically, to the electric energy converters within the supply grid and the equipment for generating and consuming said energy.

BACKGROUND OF THE INVENTION

The industry dedicated to energy generation, and particularly the renewable energy industry, requires electric energy conversion systems with increasingly higher powers. To obtain high-power conversion systems, one of the common techniques is to use several conversion units at once, such that for N units a total power equal to N times the power of each conversion unit is obtained. Conversion unit is defined as the electronic device which is responsible for adapting an input electric energy, either alternating current (AC) or direct current (DC), to characteristics imposed on the output thereof, said output being connected to a load or to an energy evacuation point.

The main reason making use of several conversion units at once necessary is the conversion modules. Generally, each conversion unit is formed by a conversion module which is connected to a generator (machine side conversion module) and a conversion module which is connected to an energy grid (grid side conversion module). Each module is formed by power semiconductors such as, insulated gate bipolar transistor (IGBT), Integrated Gate Commutated Thyristor (IGCT) and injection enhanced insulated gate bipolar transistor (IEGT), which break down an input voltage by means of high frequency commutations in order to obtain a voltage the instantaneous mean value of which is the one desired at the output.

Providing the complete systems with several conversion units lead to the conversion units having the necessary uncoupling elements allowing them to be isolated from the other units in the event of failure. When a failure occurs, i.e., when a conversion unit stop being operative (for example, because at least one of its conversion modules fails) and is not capable of generating the output current required therefrom, the maximum power which the system is capable of generating in entirety declines by a factor of 1/N.

However, if the number of conversion units for reducing said factor of 1/N is increased, the complexity of the system as well as its cost and the space necessary for installing it is increased. Likewise, the probability that a failure occurs in any of the conversion units is increased.

Particularly, the requirements of high-power conversion systems with an improved availability have increased considerably due to the boom of the new offshore wind energy generation locations in which the problem due to the difficulty of maintaining them and the great loss of energy involving the lack of availability thereof is increased. Therefore, different application systems and methods have been developed for the purpose of increasing the availability of the conversion systems.

US 2006/0214428 discloses a conversion system provided with a reserve conversion unit which is used when some of the other conversion units are out of service.

This solution therefore involves increasing the number of conversion units of the system which has the clear drawback of involving an increased complexity, cost, and space required. This drawback is made worse in wind turbines where the conversion system is located in the nacelle of the wind generator, where space is really limited due to the high cost of the materials used in enveloping the nacelle.

Additionally, it involves an inefficient use of resources because the reserve unit only acts when some of the other conversion units fail; and it is only capable of compensating the failure of a single conversion unit (if the failure of more units is to be compensated, installing several reserve units is necessary, further worsening the drawbacks described).

In addition, WO2009/027520 takes advantage of the increase which the grid side conversion modules have in the output current, due to the low power factors demanded by the network codes.

To that end it has a conversion system in which all the conversion units are coupled in DC and can work as machine side conversion module or grid side conversion module depending on the status of the different conversion units.

This invention has the drawback that if any of the conversion units is out of service, the conversion system does not have sufficient capacity for meeting the grid requirements for which it was conceived.

Additionally, it forces all the conversion units to be sized for meeting the requirements demanded in the grid side conversion modules, increasing the complexity and the cost thereof, and resulting in an inefficient use of resources when the latter operate as machine side conversion modules.

The object of the present invention is to provide the conversion system with a greater availability with the necessary conversion units for which it has been conceived to operate in nominal conditions.

Therefore, there is the need of an electric energy conversion system with a greater availability and smaller space requirements, capable of being adapted to the failure situations of some of the conversion units forming it, without therefore increasing the number or the performances of said conversion units, and therefore making efficient use of the resources forming it.

SUMMARY OF THE INVENTION

The present invention solves the problems previously described by means of an electric energy converter adapting the maximum output current of the conversion modules forming it when some of the conversion units stop being operative (either partially or completely, i.e., provided that said unit is not capable of generating the maximum current which is assigned). This invention is therefore especially useful in wind energy generation systems, in which the space dedicated to the energy converter is very limited, although it can, nevertheless, be applied to any other environment.

A first aspect of the invention provides an electric energy conversion system comprising at least two conversion units, each of which comprises in turn a first conversion module suitable to be connected to an energy grid (which, for clarity, are called in the present document grid side conversion module) and a second conversion module suitable to be connected to an energy generation device (which are called in the present document machine side conversion module). Each conversion module has a maximum output current, therefore the output power of the system being determined by said maximum currents.

To allow adapting the system to situations in which a failure is produced in some of the conversion units and the latter stops being capable of generating the maximum output current assigned, the system comprises control means establishing the maximum output current of the operative conversion modules, as well as the commutation frequency of the entire or of a sub-group of the operative conversion modules to thus increase the availability of the conversion system in the event of failures.

In order to establish said maximum output current, the system incorporates

Control means suitable for:
detecting the number of operative conversion units of the system
establishing the needs of a maximum output current of each conversion module depending on the coolant temperature and on the commutation frequency.
measuring the coolant temperature in at least one representative point of the conversion system
calculating and establishing the commutation frequency in at least one operative conversion module depending on the number of operative conversion units and on the coolant temperature.
Conversion modules adapted for:
operating at the frequency established by the control means.

Preferably, the control means are either a single controller connected to all the conversion units which therefore establishes the maximum output current of the conversion modules forming them in a synchronized manner; or a plurality of independent controllers, each of which is connected to a conversion unit and controls it in an isolated manner.

In a preferred embodiment, a representative point of the conversion system for measuring the coolant temperature is the inlet of at least one of the conversion modules.

The conversion system is valid for any machine side conversion module and grid side conversion module configuration, two preferred options being a four squares configuration (4 Q) and a passive configuration.

A second aspect of the invention presents an electric energy conversion method comprising the following steps:
detecting the number of operative conversion units,
establishing the needs of maximum output current of the conversion modules which form the conversion units that are operative.
measuring the coolant temperature in a representative point of the conversion system.
calculating and establishing the commutation frequency of at least one operative conversion module depending on the number of operative conversion units and on the coolant temperature.

In a preferred embodiment, the operative conversion modules operate at the commutation frequency established by the control means.

Two preferred options are presented with respect to synchronizing the actuation on the conversion modules:
modifying the maximum output current of all the conversion modules in a synchronize manner.
modifying the maximum output current of each conversion module independently.

Therefore with the present method and system adapting to the failure situations of some of the conversion units, partially or completely compensating the output power reduction caused by said failure, and without the need of increasing the number of conversion units or using reserve conversion units, thus reducing the space and the necessary components of the converter is achieved. This and other advantages of the invention will be better understood from the detailed description thereof.

BRIEF DESCRIPTION OF THE DRAWINGS

For the purpose of aiding to better understand the features of the invention according to a preferred practical embodiment thereof and to complement the description, the following drawings, which are illustrative and non-limiting, are attached as an integral part thereof.

DETAILED DESCRIPTION OF THE INVENTION

In this text, the term "comprises" and its derivations (such as "comprising", etc.) must not be interpreted in an excluding manner, i.e., these terms must not be interpreted as excluding the possibility that what is described and defined may include other elements, steps, etc.

Likewise, it should be noted that, despite the fact that the detailed description of the invention is made according to a series of preferred embodiments with a determined number of conversion units and with certain characteristics of the input and output voltage of the system, the latter is valid for any other number of conversion units, as well as for any other input and output configuration of the system.

In addition, it must be understood that when speaking of a coolant (for example, water) in this invention it is not limited exclusively to fluid cooling conversion systems rather the concept must be extrapolated to systems which may be air cooling system.

Figure 1:
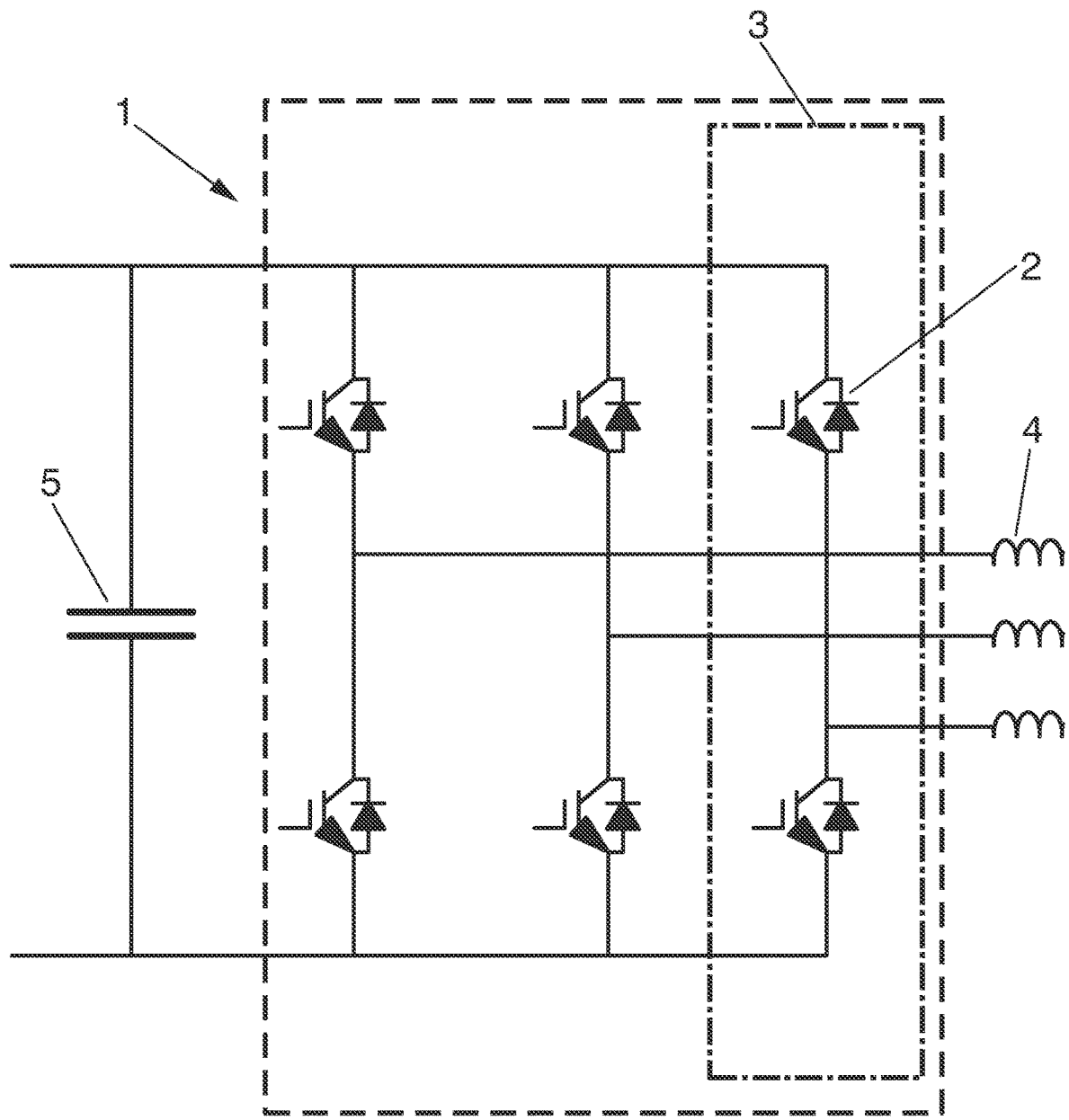
FIG. 1 shows a conventional two level DC/AC converter module according to the state of the art, formed in turn by three commutation cells, one per phase.

FIG. 1 shows a conventional electric energy conversion module 1 with two level DC/AC topology. The conversion module 1 is formed by as many commutation cells 3 as active phases, and each of these commutation cells 3 is in turn formed by a plurality of power semiconductors 2 (in this example, two semiconductors 2 per commutation cell 3 since it is a two level system). Each commutation cell 3 is responsible for fixing at the AC output 4 the average instantaneous voltage necessary in the corresponding active phase. To that end, the semiconductors 2 break down the DC input voltage 5.

Upon switching on the IGBT, a transitory state in which the voltage between the collector and emitter of the power semiconductor 2 reduces to close to zero appears, whereas the current flowing through the semiconductor 2 increases to the desired value. Upon switching off the IGBT, the voltage increases until becoming the DC input voltage 5 and the current reduces to zero. Finally, upon switching off the diode, the voltage reduces from approximately zero to less than the DC input voltage 5 and the current reduces from the value corresponding to the voltage flowing in the time of transition, to zero.

All these transitory states cause an energy dissipation in the commutations of the power semiconductor 2 called commutation losses.

During the conduction operation thereof, there is also an energy loss which depends, for a given current, on the voltage drop produced between the collector and emitter of the semiconductor 2. This energy dissipation is called conduction loss.

For a commutation frequency of the conversion module 1, the average power loss of the power semiconductor 2 during a commutation period can be expressed as:

$$Pav = Fsw \times \int_0^{\frac{1}{Fsw}} V(t) \cdot I(t) \cdot dt$$

Wherein Pav is the average power loss, Fsw is the commutation frequency, and V.I is the instantaneous power dissipated in the semiconductor 2.

The power dissipated in each power semiconductor 2 is transformed into heat, increasing the working temperature of the semiconductor 2. The heat transfer produced in the semiconductor 2 due to its power loss is typically calculated by means of finite elements taking into account the three-dimensionally shaped system.

By means of a simplified model in stationary state, the temperature for connection of the semiconductor 2 can be represented by the following equations:

$$Tj_{IGBT} = Pav_{IGBT} \times (Rth_{ha} + Rth_{ch} + Rth_{jc}) + TA$$

$$Tj_{FWD} = Pav_{FWD} \times (Rth_{ha} + Rth_{ch} + Rth_{jc}) + TA$$

Wherein $Pav_{IGBT}$ is the average power loss in the IGBT; $Pav_{FWD}$ is the average power loss in the diode; $Rth_{ha}$ is the thermal resistance that the radiator has; $Rth_{ch}$ is the thermal resistance of the cold plate of the semiconductor 2; $Rth_{jc}$ is the thermal resistance between the cold plate and the silicon connection; and $T_A$ is the room temperature.

By means of the equations described, how the temperature acquired by the power semiconductor 2 depends on the average power, which is directly related with the commutation frequency, is observed. For a given conversion module with a radiator and a specific IGBT (i.e., given thermal resistances), it depends on the temperature of the radiator, which, if it is a water-cooling radiator depends in turn on the temperature of the cooling water.

The power semiconductors 2 are manufactured for a maximum working temperature (125° C. being a typical value). However, for the purpose of prolonging the lifespan of the semiconductor 2, the semiconductor 2 is not allowed to exceed a maximum safe temperature (typical value 115° C.).

This maximum safe temperature limits the output current of the semiconductor 2 below the maximum current for which it has been designed, the conversion module 1 therefore loosing power evacuating capacity by not using the design maximum output current.

If a conversion module 1 with a commutation frequency of 2.5 Khz in which it has a continuous voltage equal to 1080V is taken as an example, a 1000 A efficient output current is extracted when the input water temperature is 55° C. according to the model described.

However, the same power semiconductors forming part of the conversion module 1 are, by design, capable of evacuating a greater current, in this example, of 1350 A. Under the same conditions, this increase in the output current involves an increase of the temperature in the connection of the IGBT, (following with the example, from 111° C. to 123° C.), therefore the power semiconductors 2 being found out of the safety margins imposed. Nevertheless, by reducing the commutation frequency (2 KHz) maintaining the output current (1350 A), a reduction in the temperature (from 123° C. to 113° C.) is also produced, returning to be within the design limits.

Likewise, if either the room temperature in air cooling or the input water temperature is reduced, the temperature in the connection is reduced in the same ratio.

With this explanation, it can be understood that the maximum current which the different conversion modules 1 may be able to handle is completely linked to the commutation frequency of the semiconductors 2 and to the coolant input temperature.

Figure 2:
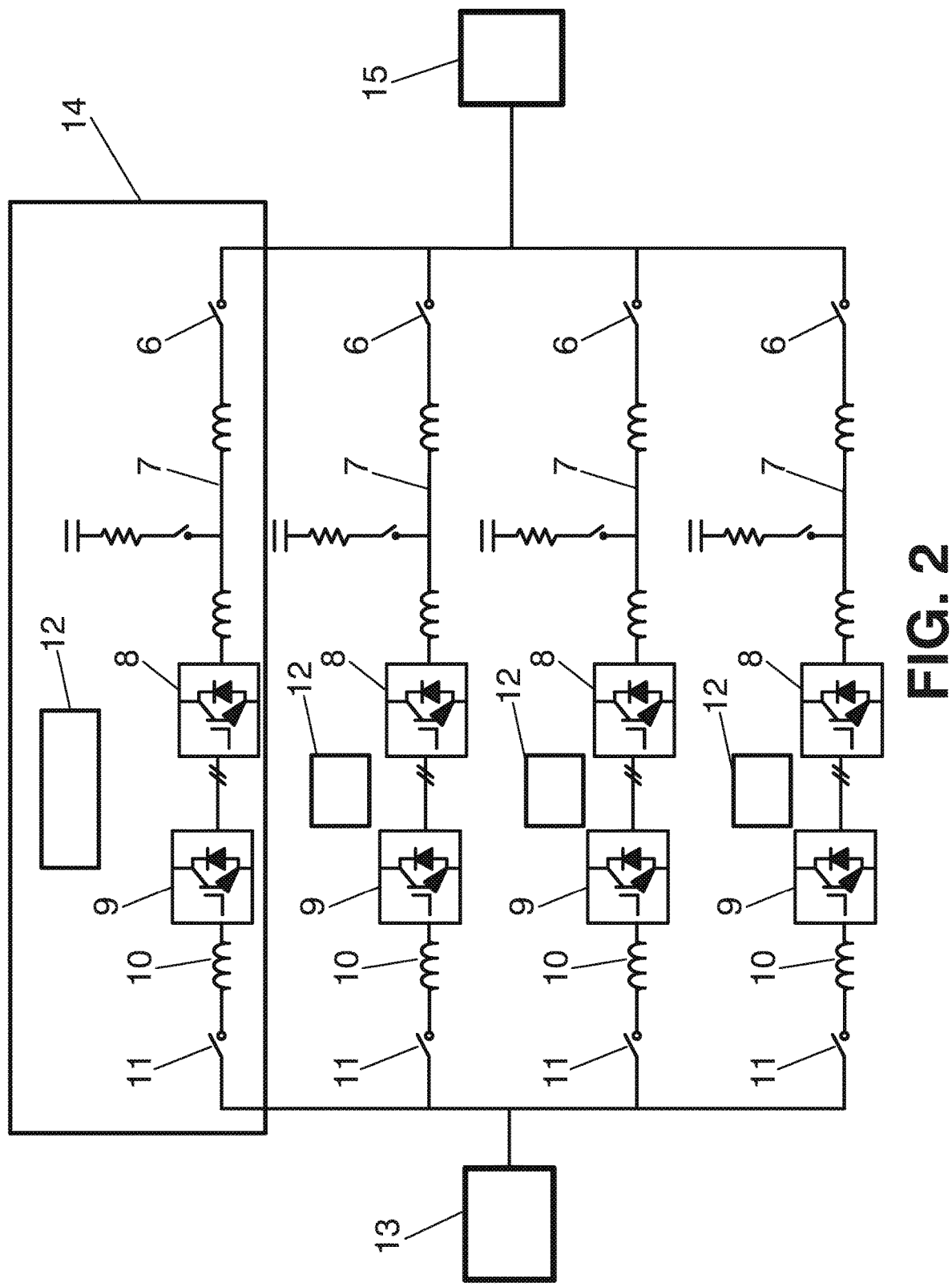
FIG. 2 shows an electric energy conversion system with four conversion units according to a preferred embodiment of the present invention, as well as an energy grid and an energy generation device as example of interaction.

FIG. 2 shows an example of a system according to a preferred embodiment of the present invention. Particularly, the system is formed by four conversion units 14, each of which comprises a grid side isolator 6, a grid filter 7, a first AC/DC conversion module 8, a second AC/DC conversion module 9, a dv/dt filter 10, a machine side isolator 11, and control means 12. The control means 12 in turn implement a preferred embodiment of the method of the invention, such as described below. Likewise, in the present example the control means 12 comprise an independent controller in each conversion unit 14, but the option of using a single controller connected to all the conversion units 14 is also contemplated.

The converter system is specially adapted to be connected at one end to an energy grid 15, and at another end to an energy generation system 13. Said energy generation system 13 may be a wind system, in which the space savings derived from the present invention is especially useful, but any other energy generation system 13 is also valid. Additionally, both the grid side and machine side coils can be uncoupled electrically.

If any of the conversion units 14 forming part of the system is out of service, i.e., it is not capable of providing the output current required, the control means 12 modify the output current of the other operative conversion modules.

If the coolant temperature (for example the input water temperature) is reduced by a factor ΔT, the temperature in the connection is also reduced by said factor. If it is assumed that the system is formed by N conversion units 14 each of them evacuating maximum loss to the Pcu water. The total loss (Ptotal) of the conversion system are Ptotal=N×Pcu.

If a conversion unit is out of service, the maximum output current of each conversion unit 14 remains constant (3×1000 A for a system with four units originally and a nominal output of 4000 A), the losses evacuated to the water of the new system are (N−1) times the loss of each conversion unit 14, i.e.: Ptotal=(N−1)×Pcu.

Therefore if it is assumed that there is a thermal loss difference between the inlet and outlet of the exchanger of the conversion system of k (K/kW), if the conversion system has all the operative conversion units 14 (maximum output current of 4×1000 A=4000 A) the thermal difference with respect to the environment is ΔT=(N×Pcu)×k.

Likewise, if a conversion unit 14 is out of service (maximum output current of 3×1000 A=3000 A) the thermal difference with respect to the environment is ΔT=((N−1)×Pcu)×k.

Therefore the thermal difference between the environment and the coolant in the event that a conversion unit 14 is out of service is reduced according to $(\Delta T_{n-1})/\Delta T_n = (N-1)/N$.

By knowing the new input water temperature and by knowing the maximum current needs which will be needed in the operative conversion modules, the commutation frequency thereof can be calculated. Said commutation frequency can be changed independently in the grid side conversion module 8, in the machine side conversion module 9, or in both.

Figure 3:
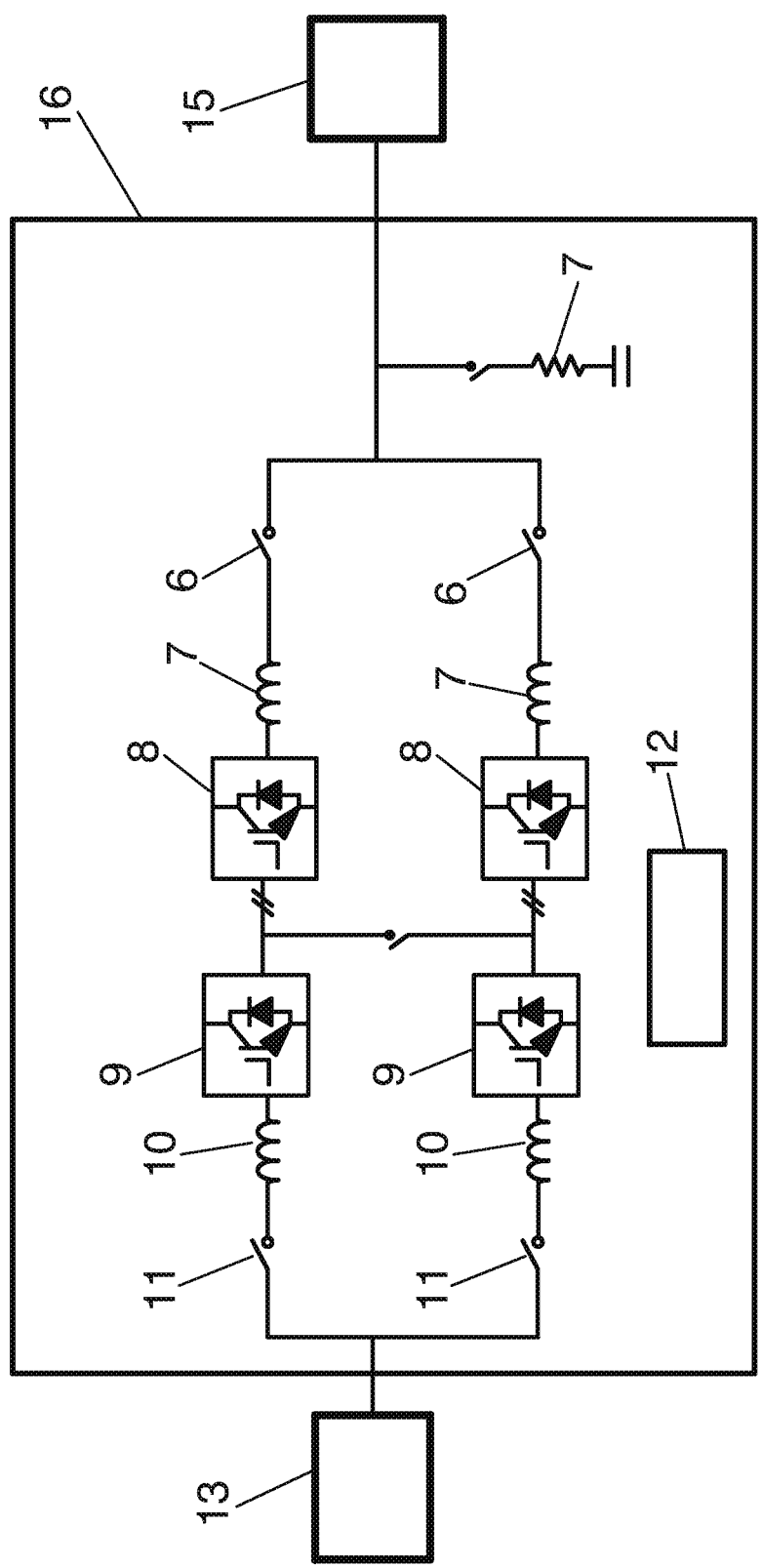
FIG. 3 shows an electric energy conversion system according to another preferred embodiment of the present invention with two conversion units sharing the RC of the grid filter.

FIG. 3 shows a conversion system 16 formed by two conversion units 14 sharing the RC (resistance and condenser) of the grid filter 7. Likewise, both conversion units 14 may share the entire grid filter 7. Again, in the event of failure of one of the two conversion units 14, the control means 12 determine the commutation frequency of the operative conversion module 14 depending on the input water temperature and fix a maximum output current of the operative conversion unit 14 in order to increase the availability of the conversion system 16 in the event of failure.

Each conversion unit 14 also comprises a isolator in the machine side 11 and a isolator in DC 6, allowing isolating the out of service conversion unit 14.

In view of this description and drawings, the person skilled in the art will understand that the invention has been described according to several preferred embodiments thereof, but several variations can be introduced in said preferred embodiments without departing from the scope of the claimed invention.

The invention claimed is:

1. An electric energy conversion system comprising at least two conversion units, each conversion unit comprising a first conversion module adapted to be connected to an energy grid and a second conversion module adapted to be connected to an energy generation device, the system further comprising a controller configured to:
   detect a number of operative conversion units of the system,
   measure a coolant temperature in at least one point of the conversion system,
   calculate and establish a commutation frequency that permits a maximum output current in the at least one operative conversion module based on the number of operative conversion units detected and on the coolant temperature,
   control the at least one conversion module to operate based on the commutation frequency established by the controller, to partially or completely compensate the output power reduction caused by a failure of at least one conversion module using the operative conversion units.

2. The conversion system according to claim 1, in which the controller is connected to all the conversion units.

3. An electric energy conversion system comprising at least two conversion units, each conversion unit comprising a first conversion module adapted to be connected to an energy grid and a second conversion module adapted to be connected to an energy generation device, the system further comprising a plurality of controllers configured to:
   detect a number of operative conversion units of the system,
   measure a coolant temperature in at least one point of the conversion system,
   calculate and establish a commutation frequency that permits a maximum output current in the at least one operative conversion module based on the number of operative conversion units detected and on the coolant temperature,
   control the at least one conversion module to operate based on the commutation frequency established by one of the controllers, wherein, each of the controllers are independently connected to one of the conversion units, to partially or completely compensate the output power reduction caused by a failure of at least one conversion module using the operative conversion units.

4. The conversion system according to claim 1, in which the first conversion modules and the second conversion modules have a configuration selected from: 4-quadrant configuration and passive configuration.

5. An electric energy conversion method which comprises:
   detecting a number of operative conversion units,
   measuring the temperature of a coolant in at least one point of the conversion system,
   calculating and establishing a commutation frequency that permits a maximum output current of the at least one operative conversion module depending on the number of operative conversion units detected and on the coolant temperature,
   generating said maximum output current, to partially or completely compensate the output power reduction caused by a failure of at least one conversion module using the operative conversion units.

6. The conversion method according to claim 5, wherein the conversion modules operate at the established commutation frequency.

7. The conversion method according to claim 5, wherein the step of establishing the maximum output current of the operative conversion units comprises establishing in a synchronize manner the maximum output current of all the operative conversion units.

8. The conversion method according to claim 5, wherein the step of establishing the maximum output current of the operative conversion units comprises modifying independently the maximum output current of all the operative conversion units.

* * * * *